(12) United States Patent
Kao

(10) Patent No.: US 7,434,844 B2
(45) Date of Patent: Oct. 14, 2008

(54) QUICK RELEASE PIPE CONNECTION

(76) Inventor: Ta-Hai Kao, No. 417-100, Sec. 4, Kung Hsueh Road, Tainan (TW)

( * ) Notice: Subject to any disclaimer, the term of this patent is extended or adjusted under 35 U.S.C. 154(b) by 498 days.

(21) Appl. No.: 11/288,934

(22) Filed: Nov. 29, 2005

(65) Prior Publication Data
US 2007/0120361 A1 May 31, 2007

(51) Int. Cl.
*F16L 37/00* (2006.01)
(52) U.S. Cl. .............. 285/317; 137/614.03; 137/614.04
(58) Field of Classification Search ................. 285/317, 285/312, 311, 310, 308; 137/614.03, 614.05
See application file for complete search history.

(56) References Cited

U.S. PATENT DOCUMENTS

| | | | |
|---|---|---|---|
| 3,525,361 A * | 8/1970 | Jeromson, Jr. et al. . | 137/614.04 |
| 4,436,125 A * | 3/1984 | Blenkush ..................... | 285/308 |
| 4,541,457 A * | 9/1985 | Blenkush ............... | 137/614.05 |
| 4,613,112 A * | 9/1986 | Phlipot et al. ............... | 285/317 |
| 4,863,201 A * | 9/1989 | Carstens ..................... | 285/317 |
| 5,033,777 A * | 7/1991 | Blenkush ..................... | 285/317 |
| 5,232,020 A * | 8/1993 | Mason et al. .......... | 137/614.04 |
| 5,494,074 A * | 2/1996 | Ramacier et al. ....... | 137/614.04 |
| 5,845,943 A * | 12/1998 | Ramacier et al. ....... | 137/614.04 |
| 6,161,578 A * | 12/2000 | Braun et al. ........... | 137/614.04 |

* cited by examiner

*Primary Examiner*—David E Bochna
(74) *Attorney, Agent, or Firm*—Alan Kamrath; Kamrath & Associates PA

(57) ABSTRACT

A quick release pipe connection includes a first connector and a second connector detachably combined with the first connector. The first connector includes a first connector seat, a first connecting member, a locking member, a limit pin, a first support member, a first elastic member, and a first stop member. The second connector includes a second connector seat, a second connecting member, a second support member, a second elastic member, and a second stop member. Thus, the first connector is combined with the second connector by inserting the second connecting member into the first connecting member, and the second connector is detached from the first connector by pressing the press portion of the locking member, so that the pipe connection is assembled and disassembled easily and rapidly.

20 Claims, 6 Drawing Sheets

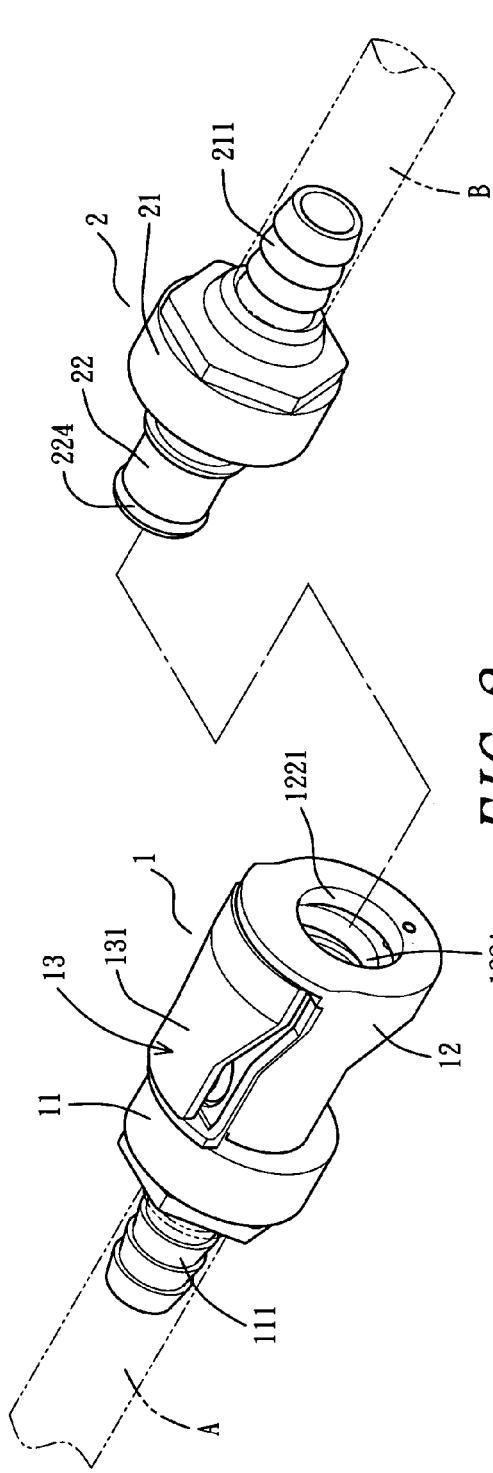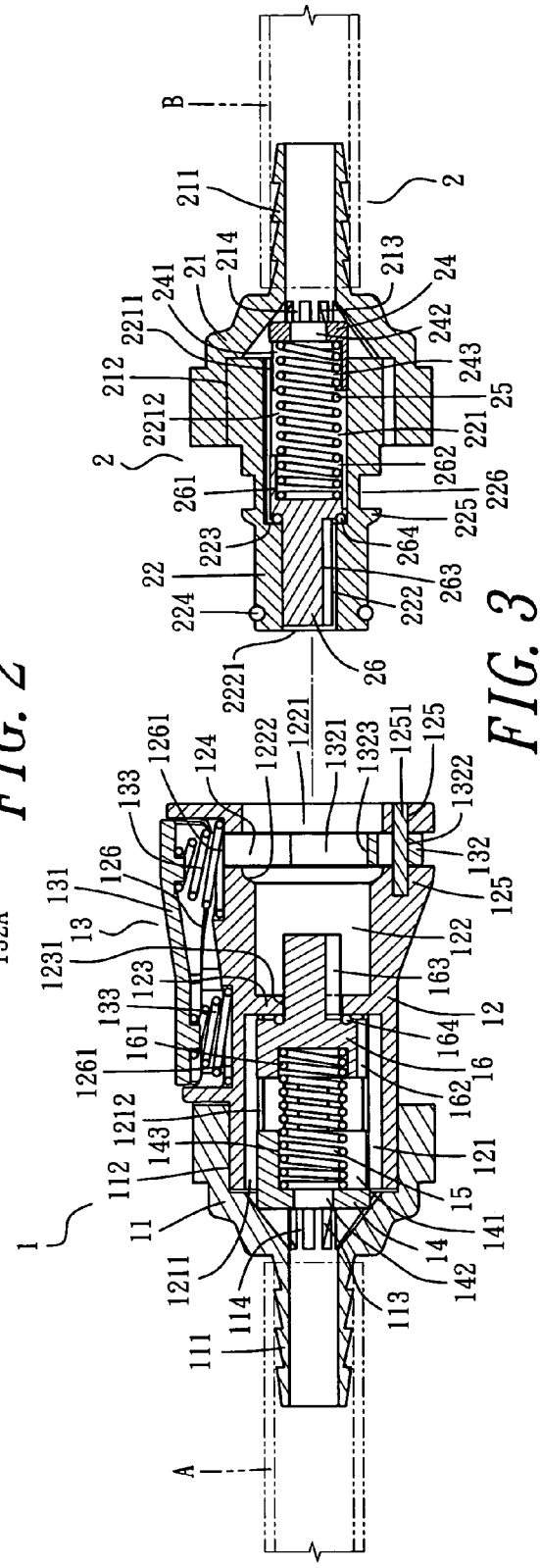

dance with the preferred embodiment of the present invention.

QUICK RELEASE PIPE CONNECTION

BACKGROUND OF THE INVENTION

1. Field of the Invention

The present invention relates to a pipe connection and, more particularly, to a quick release pipe connection.

2. Description of the Related Art

A conventional pipe connection comprises a first connector connected to a first pipe, and a second connector connected to a second pipe and combined with the first connector by a screw member. Thus, the first pipe and the second pipe are connected by the pipe connection. However, the second pipe cannot be mounted on or detached from the first connector easily so that the pipe connection is not assembled and disassembled easily and rapidly, thereby causing inconvenience to the user in operating the pipe connection.

SUMMARY OF THE INVENTION

The primary objective of the present invention is to provide a quick release pipe connection.

Another objective of the present invention is to provide a pipe connection that is assembled and detached easily and rapidly, thereby facilitating a user operating the pipe connection.

A further objective of the present invention is to provide a pipe connection, wherein when the second connecting member is inserted into the first connecting member, the second connecting member is locked on the first connecting member by the locking member so as to lock the second connector on the first connector, so that the first connector is combined with the second connector easily and rapidly.

A further objective of the present invention is to provide a pipe connection, wherein when the press portion of the locking member is pressed, the second connecting member is pushed outward relative to the first connecting member by the restoring force of the first elastic member and the second elastic member, thereby detaching the second connector from the first connector, so that the second connector is detached from the first connector easily and rapidly.

A further objective of the present invention is to provide a pipe connection, wherein the first connector is combined with the second connector by inserting the second connecting member into the first connecting member, and the second connector is detached from the first connector by pressing the press portion of the locking member, so that the pipe connection is assembled and disassembled easily and rapidly.

Further benefits and advantages of the present invention will become apparent after a careful reading of the detailed description with appropriate reference to the accompanying drawings.

BRIEF DESCRIPTION OF THE DRAWINGS

FIG. 2 is a partially exploded perspective view of the pipe connection as shown in FIG. 1.

FIG. 3 is a plan cross-sectional view of the pipe connection as shown in FIG. 2.

DETAILED DESCRIPTION OF THE INVENTION

Figure 1:
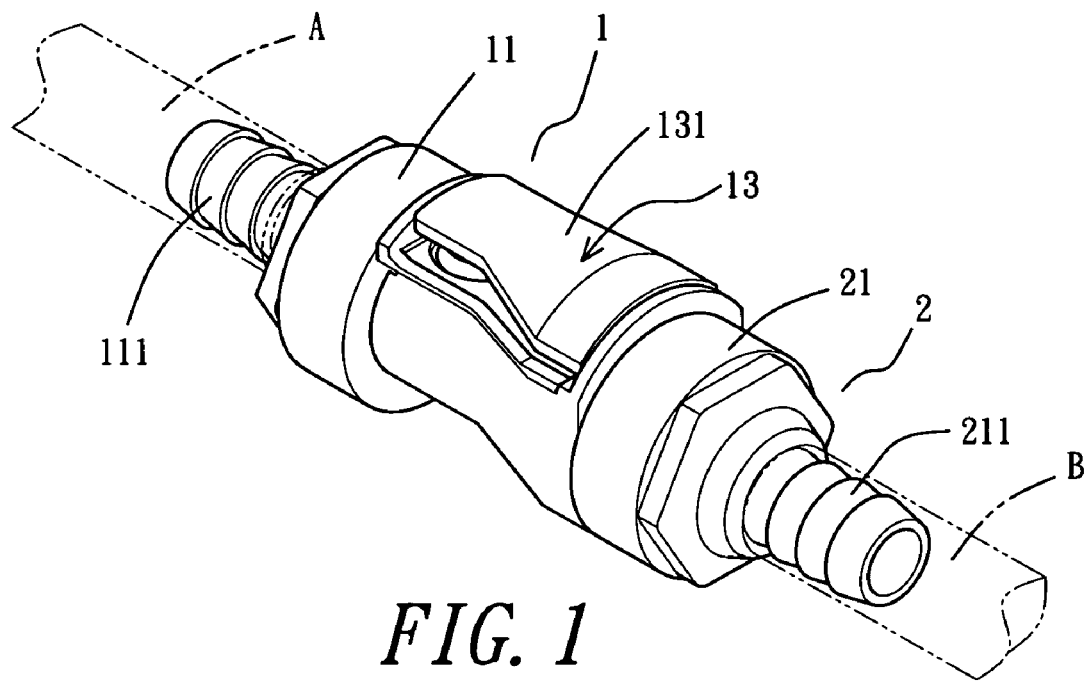
FIG. 1 is a perspective view of a pipe connection in accordance with the preferred embodiment of the present invention.

Referring to the drawings and initially to FIGS. 1-7, a pipe connection in accordance with the preferred embodiment of the present invention comprises a first connector 1 connected to a first pipe "A", and a second connector 2 connected to a second pipe "B" and detachably combined with the first connector 1.

The first connector 1 includes a first connector seat 11, a first connecting member 12, a locking member 13, a first support member 14, a first elastic member 15, and a first stop member 16.

The first connector seat 11 of the first connector 1 has a first end provided with an insertion tube 111 inserted into the first pipe "A" and a second end having an inside formed with a mounting recess 112 and a plurality of axially extending conduits 114 connected between the insertion tube 111 and the mounting recess 112. The conduits 114 of the first connector seat 11 are formed by a plurality of axially extending baffles 113.

The first connecting member 12 of the first connector 1 is mounted on the first connector seat 11 and has an inside formed with a first chamber 121, a second chamber 122 and a separation wall 123 located between the first chamber 121 and the second chamber 122 and formed with a through hole 1231 connected between the first chamber 121 and the second chamber 122. The first connecting member 12 of the first connector 1 has a first end inserted into the mounting recess 112 of the first connector seat 11 and formed with a first opening 1211 connected to the first chamber 121 and a second end formed with a second opening 1221 connected to the second chamber 122. The first chamber 121 of the first connecting member 12 has a periphery formed with a plurality of axially extending channels 1212. The second chamber 122 of the first connecting member 12 has an enlarged stop edge 1222 (see FIG. 3). The second end of the first connecting member 12 has a periphery formed with a transversely extending slide slot 124 extended through the second chamber 122 and located between the stop edge 1222 and the second opening 1221. The second end of the first connecting member 12 has an end face formed with an axially extending insertion hole 125 extended through the slide slot 124. The first connecting member 12 of the first connector 1 has a top face formed with a depression 126 connected to the slide slot 124. The depression 126 of the first connecting member 12 has two spaced mounting grooves 1261. The depression 126 and the slide slot 124 of the first connecting member 12 form a substantially L-shaped profile.

The locking member 13 of the first connector 1 has a substantially L-shaped profile. The locking member 13 of the first connector 1 has a first section provided with a press portion 131 mounted in the depression 126 of the first connecting member 12 and a second section perpendicular to the first section and provided with a slide 132 movably mounted in the slide slot 124 of the first connecting member 12. The press portion 131 of the locking member 13 has a bottom provided with two spaced mounting posts 1311, and the first connector 1 further includes two restoring springs 133 biased between the press portion 131 of the locking member 13 and the first connecting member 12 and each having a first end mounted in the respective mounting grooves 1261 of the first connecting member 12 and a second end mounted on the respective mounting post 1311 of the locking member 13. The slide 132 of the locking member 13 has a first portion formed with a passage 1321 aligning with the second opening 1221 of the first connecting member 12 and having a bottom formed with a locking edge 1323 and a second portion formed with an elongated guide slot 1322 aligning with the insertion hole 125 of the first connecting member 12.

A limit pin 1251 is extended through the insertion hole 125 of the first connecting member 12 and the guide slot 1322 of the slide 132 of the locking member 13 to limit a sliding movement of the slide 132 of the locking member 13.

Thus, the locking member 13 is pushed outward relative to the first connecting member 12 and the limit pin 1251 by the restoring springs 133 so that the limit pin 1251 is located at a bottom of the guide slot 1322 of the locking member 13, and the locking edge 1323 of the locking member 13 is located at a height greater than that of the stop edge 1222 of the first connecting member 12 as shown in FIG. 3.

Alternatively, the locking member 13 is pressed (by a user) toward the first connecting member 12 and the limit pin 1251 to overcome the elastic force of the restoring springs 133 so that the limit pin 1251 is located at a top of the guide slot 1322 of the locking member 13, and the locking edge 1323 of the locking member 13 is located at a height smaller than that of the stop edge 1222 of the first connecting member 12.

The first support member 14 of the first connector 1 is received in the first chamber 121 of the first connecting member 12 and rested on a wall of the mounting recess 112 of the first connector seat 11. The first support member 14 of the first connector 1 has an inside formed with a mounting space 143 and a periphery formed with a plurality of axially extending breaches 141 connected to the mounting space 143. The first support member 14 of the first connector 1 has an end face rested on a side of the baffles 113 of the first connector seat 11 and formed with a through hole 142 connected between the conduits 114 of the first connector seat 11 and the mounting space 143.

The first stop member 16 of the first connector 1 is movably mounted in the first connecting member 12 and has an enlarged first portion movably mounted in the first chamber 121 of the first connecting member 12 and a reduced second portion extended through the through hole 1231 of the separation wall 123 into the second chamber 122 of the first connecting member 12. The first portion of the first stop member 16 has a diameter smaller than that of the first chamber 121 of the first connecting member 12 and has an inside formed with a mounting space 161 and a periphery formed with a plurality of axially extending first grooves 162. The second portion of the first stop member 16 has a periphery formed with a plurality of axially extending second grooves 163.

An O-ring 164 is mounted on a connection of the first portion and the second portion of the first stop member 16 and rested on the separation wall 123 of the first connecting member 12.

The first elastic member 15 of the first connector 1 is mounted between the first support member 14 and the first stop member 16 and has a first end mounted in the mounting space 143 of the first support member 14 and a second end mounted in the mounting space 161 of the first stop member 16.

The second connector 2 includes a second connector seat 21, a second connecting member 22, a second support member 24, a second elastic member 25, and a second stop member 26.

The second connector seat 21 of the second connector 2 has a first end provided with an insertion tube 211 inserted into the second pipe "B" and a second end having an inside formed with a mounting recess 212 and a plurality of axially extending conduits 214 connected between the insertion tube 211 and the mounting recess 212. The conduits 214 of the second connector seat 21 are formed by a plurality of axially extending baffles 213.

The second connecting member 22 of the second connector 2 is mounted on the second connector seat 21 and has an inside formed with a first chamber 221, a second chamber 222 having a diameter smaller than that of the first chamber 221 and a stepped catch edge 223 located between the first chamber 221 and the second chamber 222. The second connecting member 22 of the second connector 2 has a first end inserted into the mounting recess 212 of the second connector seat 21 and formed with a first opening 2211 connected to the first chamber 221 and a second end formed with a second opening 2221 connected to the second chamber 222. The second connecting member 22 of the second connector 2 is inserted through the second opening 1221 into the second chamber 122 of the first connecting member 12 of the first connector 1. The first chamber 221 of the second connecting member 22 has a periphery formed with a plurality of axially extending channels 2212. The second connecting member 22 has a periphery formed with an annular locking groove 226 detachably locked on the locking edge 1323 of the locking member 13. The locking groove 226 of the second connecting member 22 has a side provided with a substantially arc-shaped protruding guide face 225 facing the locking edge 1323 of the locking member 13 and rested on the stop edge 1222 of the first connecting member 12. An O-ring 224 is mounted on an outer wall of the second end of the second connecting member 22.

The second support member 24 of the second connector 2 is received in the first chamber 221 of the second connecting member 22 and rested on a wall of the mounting recess 212 of the second connector seat 21. The second support member 24 of the second connector 2 has an inside formed with a mounting space 243 and a periphery formed with a plurality of axially extending breaches 241 connected to the mounting space 243. The second support member 24 of the second connector 2 has an end face rested on a side of the baffles 213 of the second connector seat 21 and formed with a through hole 242 connected between the conduits 214 of the second connector seat 21 and the mounting space 243.

The second stop member 26 of the second connector 2 is movably mounted in the second connecting member 22 and has an enlarged first portion movably mounted in the first chamber 221 of the second connecting member 22 and a reduced second portion extended through the catch edge 223 of the second connecting member 22 into the second chamber 222 of the second connecting member 22. The first portion of the second stop member 26 has a diameter smaller than that of the first chamber 221 of the second connecting member 22 and has an inside formed with a mounting space 261 and a periphery formed with a plurality of axially extending first grooves 262. The second portion of the second stop member 26 is hidden in the second chamber 222 of the second connecting member 22 without protruding from the opening 2221 and has a periphery formed with a plurality of axially extending second grooves 263.

An O-ring 264 is mounted on a connection of the first portion and the second portion of the second stop member 26 and rested on the catch edge 223 of the second connecting member 22.

The second elastic member 25 of the second connector 2 is mounted between the second support member 24 and the second stop member 26 and has a first end mounted in the mounting space 243 of the second support member 24 and a second end mounted in the mounting space 261 of the second stop member 26.

In assembly, the first connector 1 is connected to the first pipe "A", the second connector 2 is connected to the second pipe "B", and the first connector 1 is not combined with the second connector 2 as shown in FIG. 2. At this time, the O-ring 164 is urged between the connection of the first portion and the second portion of the first stop member 16 and the separation wall 123 of the first connecting member 12 to provide a sealing effect, and the O-ring 264 is urged between the connection of the first portion and the second portion of the second stop member 26 and the catch edge 223 of the second connecting member 22 to provide a sealing effect. Then, the second connecting member 22 of the second connector 2 is inserted through the second opening 1221 into the second chamber 122 of the first connecting member 12 of the first connector 1. At this time, the O-ring 224 of the second connecting member 22 is urged on the inner wall of the second chamber 122 of the first connecting member 12 during movement of the second connecting member 22 until the second stop member 26 of the second connector 2 is rested on the first stop member 16 of the first connector 1.

Figure 6:
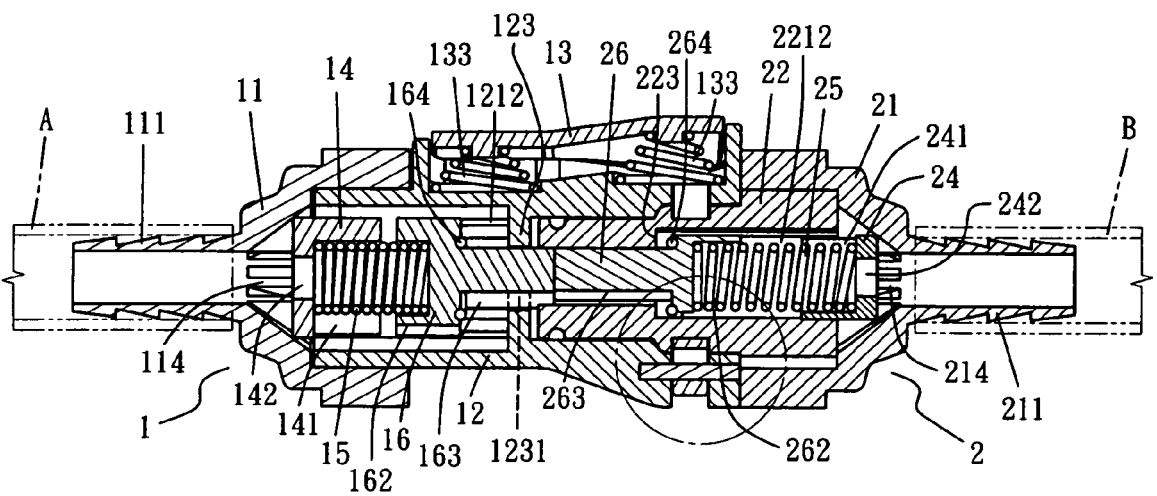
FIG. 6 is a plan cross-sectional view of the pipe connection as shown in FIG. 1.
Figure 7:
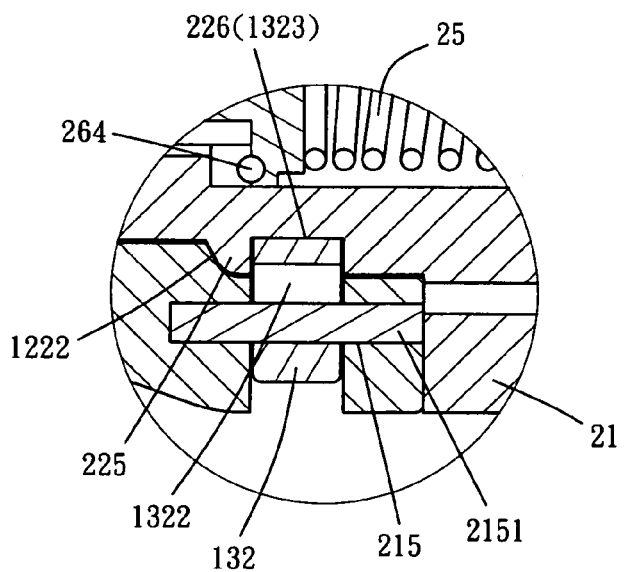
FIG. 7 is a partially enlarged view of the pipe connection as shown in FIG. 6.

When the second connecting member 22 is further moved toward the first connecting member 12, the guide face 225 of the second connecting member 22 is moved to press the locking edge 1323 of the locking member 13 to lower the slide 132 of the locking member 13. When the locking groove 226 of the second connecting member 22 is aligned with the locking edge 1323 of the locking member 13, the slide 132 of the locking member 13 is pushed upward by the restoring force of the restoring springs 133, so that the locking edge 1323 of the locking member 13 is locked in the locking groove 226 of the second connecting member 22 as shown in FIGS. 6 and 7 to lock the second connecting member 22 on the first connecting member 12 by the locking member 13 so as to lock the second connector 2 on the first connector 1. At this time, the second stop member 26 is retracted in the second connecting member 22 to compress the second elastic member 25 so that the O-ring 264 is detached from the catch edge 223 of the second connecting member 22 to release the sealing effect, and the first stop member 16 is retracted in the first connecting member 12 to compress the first elastic member 15 so that the O-ring 164 is detached from the separation wall 123 of the first connecting member 12 to release the sealing effect.

Thus, when the first connector 1 is combined with the second connector 2 as shown in FIG. 6, the fluid from the first pipe "A" in turn flows through the conduits 114 of the first connector seat 11, the through hole 142 and the breaches 141 of the first support member 14, the channels 1212 of the first connecting member 12, the first grooves 162 and the second grooves 163 of the first stop member 16, the through hole 1231 of the separation wall 123, the second grooves 263 and the first grooves 262 of the second stop member 26, the channels 2212 of the second connecting member 22, the breaches 241 and the through hole 242 of the second support member 24, and the conduits 214 of the second connector seat 21 into the second pipe "B".

Figure 8:
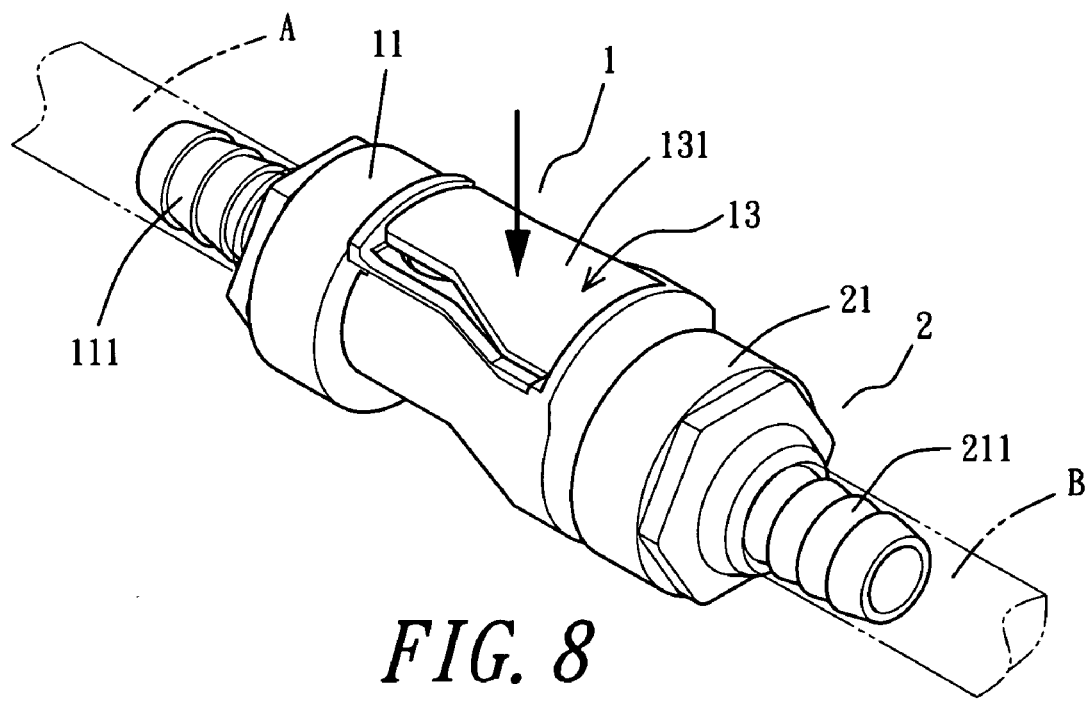
FIG. 8 is a schematic operational view of the pipe connection as shown in FIG. 1.
Figure 4:
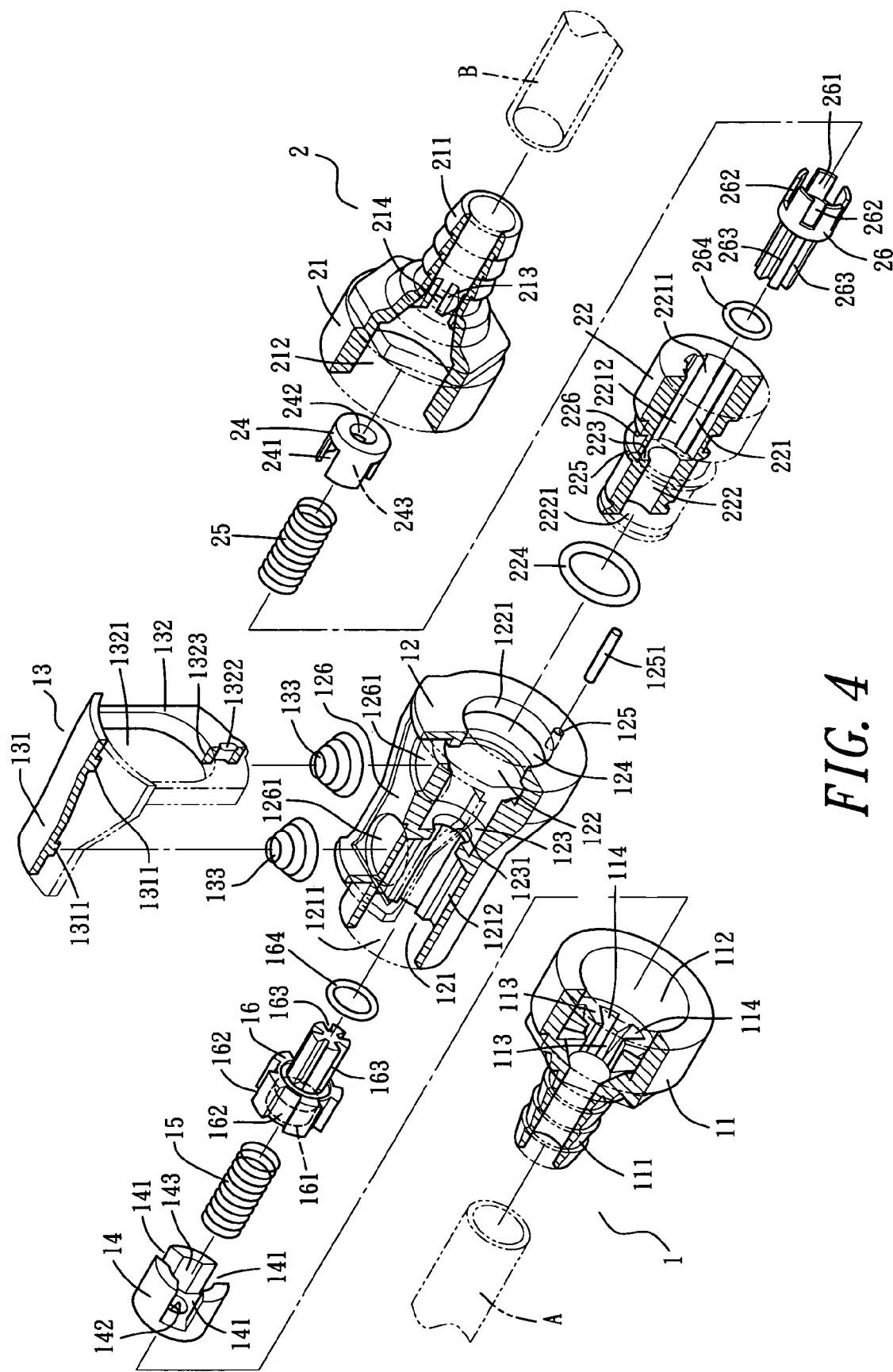
FIG. 4 is an exploded perspective view of the pipe connection as shown in FIG. 1.
Figure 5:
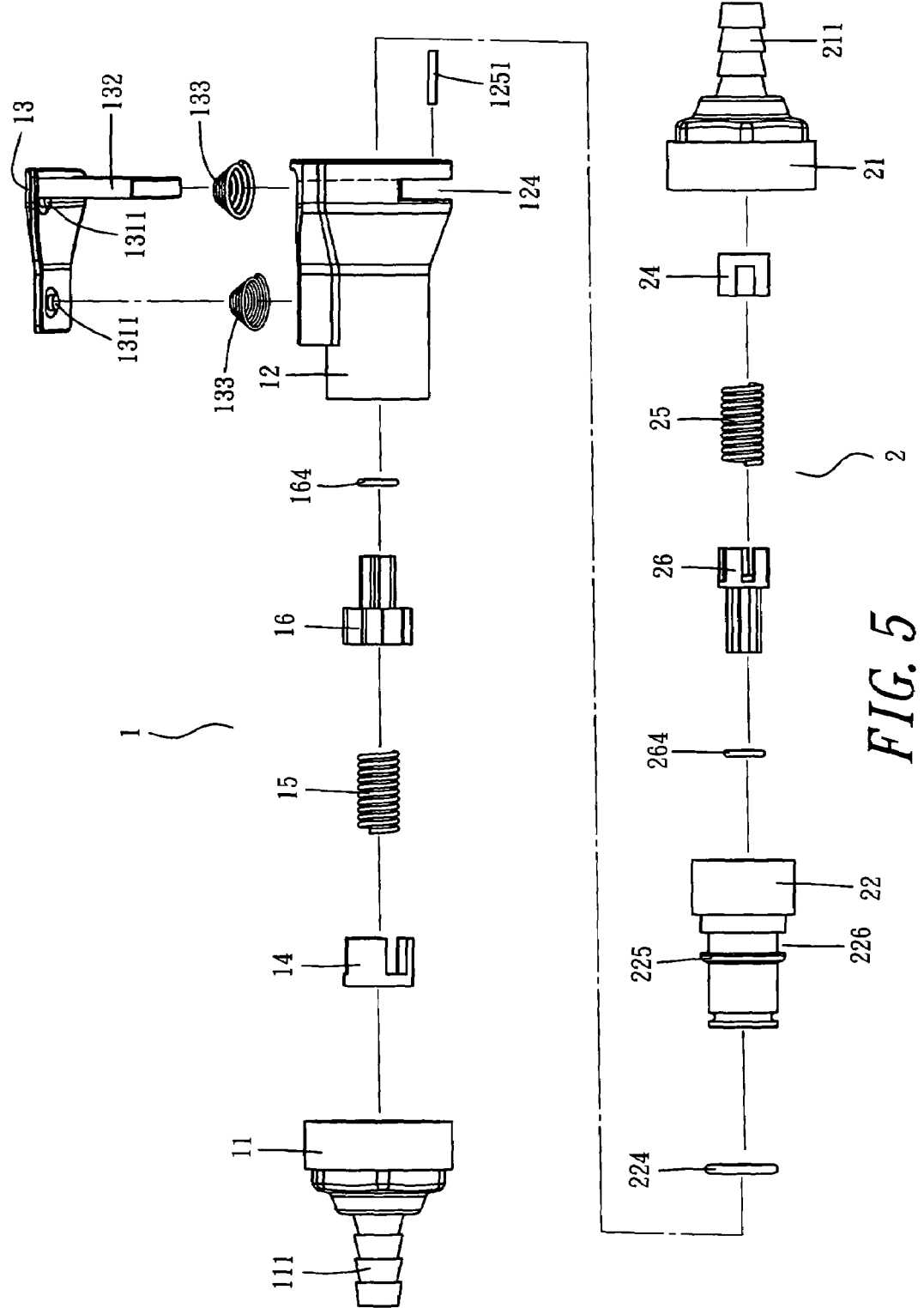
FIG. 5 is an exploded plan view of the pipe connection as shown in FIG. 1.
Figure 9:
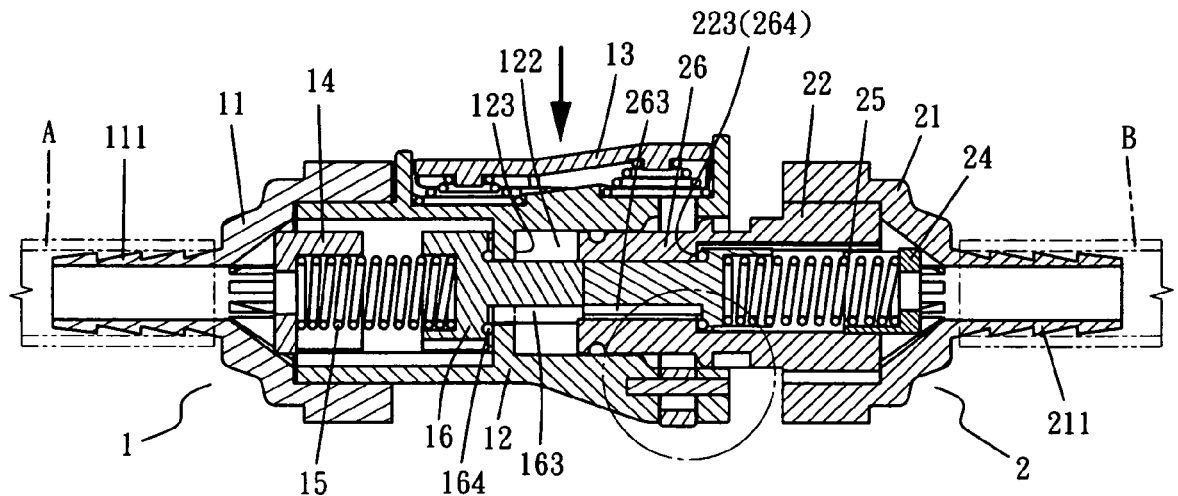
FIG. 9 is a schematic operational view of the pipe connection as shown in FIG. 6.
Figure 10:
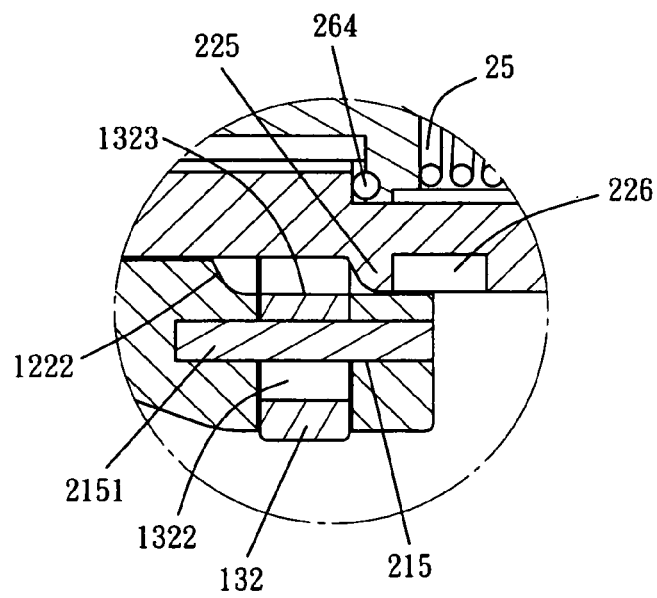
FIG. 10 is a partially enlarged view of the pipe connection as shown in FIG. 9.

Referring to FIGS. 8-10, when the press portion 131 of the locking member 13 is pressed to overcome the restoring force of the restoring springs 133, the slide 132 of the locking member 13 is moved downward so that the locking edge 1323 of the locking member 13 is moved to detach from the locking groove 226 of the second connecting member 22 as shown in FIGS. 9 and 10 so as to unlock the second connecting member 22 from the locking member 13. Then, the second connecting member 22 is pushed outward relative to the first connecting member 12 by the restoring force of the first elastic member 15 and the second elastic member 25, thereby detaching the second connector 2 from the first connector 1. At this time, the O-ring 164 is urged between the connection of the first portion and the second portion of the first stop member 16 and the separation wall 123 of the first connecting member 12 to provide a sealing effect, and the O-ring 264 is urged between the connection of the first portion and the second portion of the second stop member 26 and the catch edge 223 of the second connecting member 22 to provide a sealing effect.

Accordingly, when the second connecting member 22 is inserted into the first connecting member 12, the second connecting member 22 is locked on the first connecting member 12 by the locking member 13 so as to lock the second connector 2 on the first connector 1, so that the first connector 1 is combined with the second connector 2 easily and rapidly. In addition, when the press portion 131 of the locking member 13 is pressed, the second connecting member 22 is pushed outward relative to the first connecting member 12 by the restoring force of the first elastic member 15 and the second elastic member 25, thereby detaching the second connector 2 from the first connector 1, so that the second connector 2 is detached from the first connector 1 easily and rapidly. Further, the first connector 1 is combined with the second connector 2 by inserting the second connecting member 22 into the first connecting member 12, and the second connector 2 is detached from the first connector 1 by pressing the press portion 131 of the locking member 13, so that the pipe connection is assembled and disassembled easily and rapidly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A pipe connection, comprising a first connector and a second connector detachably combined with the first connector, wherein:

the first connector includes a first connector seat, a first connecting member, a locking member, a limit pin, a first support member, a first elastic member, and a first stop member;

the first connector seat of the first connector has a first end provided with an insertion tube and a second end having an inside formed with a mounting recess;

the first connecting member of the first connector has an inside formed with a first chamber, a second chamber and a separation wall located between the first chamber and the second chamber and formed with a through hole connected between the first chamber and the second chamber, the first connecting member of the first connector has a first end inserted into the mounting recess of the first connector seat and formed with a first opening connected to the first chamber and a second end formed with a second opening connected to the second chamber, the second end of the first connecting member has a periphery formed with a transversely extending slide slot and has an end face formed with an axially extending insertion hole extended through the slide slot;

the locking member of the first connector has a first section provided with a press portion and a second section provided with a slide movably mounted in the slide slot of the first connecting member, the slide of the locking member has a first portion formed with a passage having a bottom formed with a locking edge and a second portion formed with an elongated guide slot aligning with the insertion hole of the first connecting member;

the limit pin is extended through the insertion hole of the first connecting member and the guide slot of the slide of the locking member to limit a sliding movement of the slide of the locking member;

the first support member of the first connector is received in the first chamber of the first connecting member and rested on a wall of the mounting recess of the first connector seat;

the first stop member of the first connector is movably mounted in the first connecting member and has an enlarged first portion movably mounted in the first chamber of the first connecting member and a reduced second portion extended through the through hole of the separation wall into the second chamber of the first connecting member;

the first elastic member of the first connector is mounted between the first support member and the first stop member;

the second connector includes a second connector seat, a second connecting member, a second support member, a second elastic member, and a second stop member;

the second connector seat of the second connector has a first end provided with an insertion tube and a second end having an inside formed with a mounting recess;

the second connecting member of the second connector has an inside formed with a first chamber, a second chamber and a stepped catch edge located between the first chamber and the second chamber, the second connecting member of the second connector has a first end inserted into the mounting recess of the second connector seat and formed with a first opening connected to the first chamber and a second end formed with a second opening connected to the second chamber, the second connecting member has a periphery formed with an annular locking groove detachably locked on the locking edge of the locking member;

the second support member of the second connector is received in the first chamber of the second connecting member and rested on a wall of the mounting recess of the second connector seat;

the second stop member of the second connector is movably mounted in the second connecting member and has an enlarged first portion movably mounted in the first chamber of the second connecting member and a reduced second portion extended through the catch edge of the second connecting member into the second chamber of the second connecting member;

the second elastic member of the second connector is mounted between the second support member and the second stop member.

2. The pipe connection in accordance with claim 1, wherein the first connector further includes an O-ring mounted on a connection of the first portion and the second portion of the first stop member and rested on the separation wall of the first connecting member by an elastic force of the first elastic member.

3. The pipe connection in accordance with claim 1, wherein the second chamber of the first connecting member has an enlarged stop edge, the slide slot is extended through the second chamber and located between the stop edge and the second opening, and the locking groove of the second connecting member has a side provided with a substantially arc-shaped protruding guide face facing the locking edge of the locking member and rested on the stop edge of the first connecting member.

4. The pipe connection in accordance with claim 1, wherein the first connector further includes two restoring springs biased between the press portion of the locking member and the first connecting member.

5. The pipe connection in accordance with claim 4, wherein the first connecting member of the first connector has a top face formed with a depression connected to the slide slot and having two spaced mounting grooves, the press portion of the locking member has a bottom provided with two spaced mounting posts, and each of the two restoring springs has a first end mounted in the respective mounting grooves of the first connecting member and a second end mounted on the respective mounting post of the locking member.

6. The pipe connection in accordance with claim 5, wherein the depression and the slide slot of the first connecting member form a substantially L-shaped profile, and the locking member of the first connector has a substantially L-shaped profile.

7. The pipe connection in accordance with claim 5, wherein the press portion of the locking member is mounted in the depression of the first connecting member.

8. The pipe connection in accordance with claim 4, wherein the locking member is movable between a first position where the locking member is pushed outward relative to the first connecting member and the limit pin by the restoring springs so that the limit pin is located at a bottom of the guide slot of the locking member, and the locking edge of the locking member is located at a height greater than that of the stop edge of the first connecting member, and a second position where the locking member is pressed toward the first connecting member and the limit pin to overcome the elastic force of the restoring springs so that the limit pin is located at a top of the guide slot of the locking member, and the locking edge of the locking member is located at a height smaller than that of the stop edge of the first connecting member.

9. The pipe connection in accordance with claim 1, wherein the second connecting member of the second connector is inserted through the second opening into the second chamber of the first connecting member of the first connector.

10. The pipe connection in accordance with claim 1, wherein the second connector further includes an O-ring mounted on a connection of the first portion and the second portion of the second stop member and rested on the catch edge of the second connecting member by an elastic force of the second elastic member.

11. The pipe connection in accordance with claim 1, wherein the second end of the first connector seat has a plurality of axially extending conduits connected between the insertion tube and the mounting recess, and the second end of the second connector seat has a plurality of axially extending conduits connected between the insertion tube and the mounting recess.

12. The pipe connection in accordance with claim 11, wherein the conduits of the first connector seat are formed by a plurality of axially extending baffles, and the conduits of the second connector seat are formed by a plurality of axially extending baffles.

13. The pipe connection in accordance with claim 12, wherein the first support member of the first connector has an end face rested on a side of the baffles of the first connector seat and formed with a through hole connected between the conduits of the first connector seat and the mounting space, the second support member of the second connector has an end face rested on a side of the baffles of the second connector seat and formed with a through hole connected between the conduits of the second connector seat and the mounting space.

14. The pipe connection in accordance with claim 1, wherein the first chamber of the first connecting member has a periphery formed with a plurality of axially extending channels, and the first chamber of the second connecting member has a periphery formed with a plurality of axially extending channels.

15. The pipe connection in accordance with claim 1, wherein the first support member of the first connector has an inside formed with a mounting space and a periphery formed with a plurality of axially extending breaches connected to the mounting space, the second support member of the second connector has an inside formed with a mounting space and a periphery formed with a plurality of axially extending breaches connected to the mounting space, the first portion of the first stop member has an inside formed with a mounting space and a periphery formed with a plurality of axially extending first grooves, the first portion of the second stop member has an inside formed with a mounting space and a periphery formed with a plurality of axially extending first grooves, the first elastic member of the first connector has a first end mounted in the mounting space of the first support member and a second end mounted in the mounting space of the first stop member, and the second elastic member of the second connector has a first end mounted in the mounting space of the second support member and a second end mounted in the mounting space of the second stop member.

16. The pipe connection in accordance with claim 1, wherein the first portion of the first stop member has a diameter smaller than that of the first chamber of the first connecting member, and the first portion of the second stop member has a diameter smaller than that of the first chamber of the second connecting member.

17. The pipe connection in accordance with claim 1, wherein the second portion of the first stop member has a periphery formed with a plurality of axially extending second grooves, and the second portion of the second stop member has a periphery formed with a plurality of axially extending second grooves.

18. The pipe connection in accordance with claim 1, wherein the second connector further includes an O-ring mounted on an outer wall of the second end of the second connecting member.

19. The pipe connection in accordance with claim 1, wherein the passage is aligning with the second opening of the first connecting member.

20. The pipe connection in accordance with claim 1, wherein the second portion of the second stop member is hidden in the second chamber of the second connecting member without protruding from the opening.

* * * * *